Oct. 28, 1941. O. K. CLINTON 2,260,884
SHEARS
Filed Aug. 21, 1940
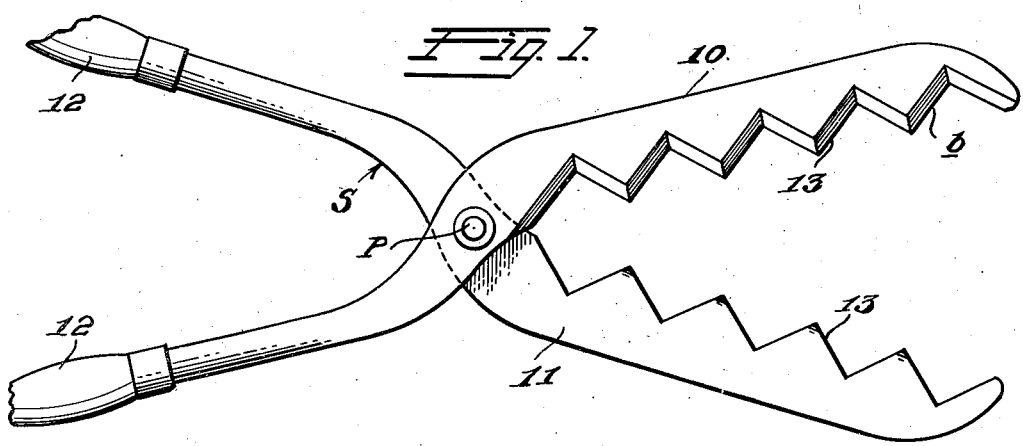
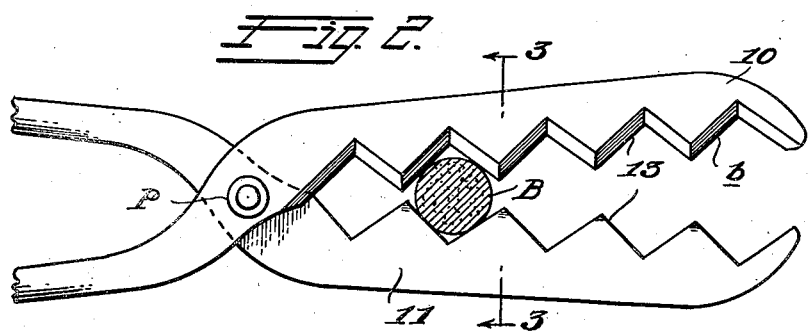
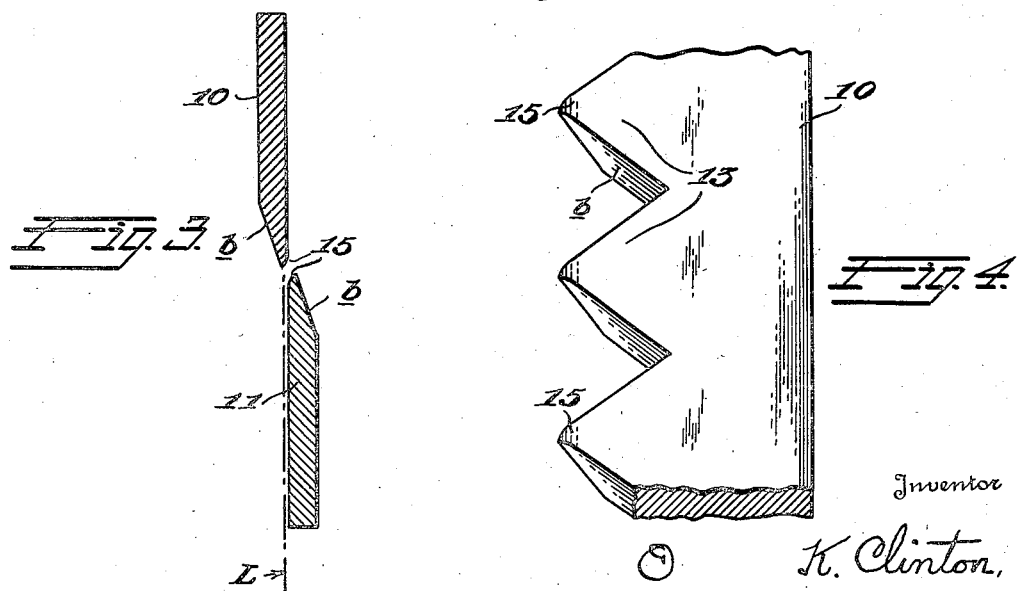
Inventor
O. K. Clinton,
By William W. Deane
his Attorney Patented Oct. 28, 1941

2,260,884

UNITED STATES PATENT OFFICE 2,260,884

SHEARS

Owen K. Clinton, Pasadena, Calif.

Application August 21, 1940, Serial No. 353,581

2 Claims. (Cl. 30—254)

This invention relates to shears.

More specifically the invention relates to shears particularly adapted for garden use in the pruning of shrubbery and the like.

Shears for this and allied uses have heretofore been constructed in various forms, practically all of which, possessed one common and objectionable structural feature, to wit, the cooperating blades were provided with substantially straight elongated cutting edges.

Shears for pruning and like uses require considerable lever pressure in order to force the opposed cooperating cutting blades through relatively thick and tough material as branches of shrubbery and the like, and while the various forms of pruning shears heretofore proposed or used were enabled to accomplish such cutting operations, the angularly related cutting edges in the open position of the blades tended to force the branch or limb toward the ends of the blades, or away from the pivotal connection of the blades whereby substantially greater effort was required to cut such branch or limb if it was not completely forced from between the blades.

In other words, with the straight edge form of shears now in vogue which includes a pair of pivoted blades having operating handles, the blades must be substantially separated in angular relation to receive a relatively large branch or limb and while most efficient cutting action is obtained when the object to be cut is adjacent the pivot, there is a pressure component longitudinally of the blades when pressure is applied to the handles which tends to displace the object away from the pivot necessitating correspondingly greater pressure application to the handles, if the object is not perchance completely displaced from between the blades.

A primary object of this invention is the provision of a shears whereby the above noted objections to prior shear constructions are satisfactorily overcome.

A further object of the invention is the provision of a shears including cooperating pivoted blades the cutting edges of which are so formed as to retain an object to be cut in a pre-determined position relative to the pivot.

A still further object of the invention is the provision of a shears whose cooperating cutting edges are defined by triangular teeth, the apices of which are slightly rounded to insure proper cutting action and avoid jamming of the teeth.

A still further object of the invention is the provision of a shears of the above noted character which are durable, simple in construction, and highly efficient in use.

For a more complete understanding of the nature and objects of the invention, reference will be had to the following detailed description, taken in connection with the accompanying drawing, wherein:

Figure 1 is a broken side elevational view of the shears in open position and as constructed in accordance with a preferred embodiment of the invention.

Figure 2 is a similar view showing the blades in cutting engagement with an object to be cut.

Figure 3 is an enlarged transverse section in a plane substantially as represented by the line 3—3 on Figure 2.

Figure 4 is a fragmental perspective view on an enlarged scale of one of the blades.

Referring now in detail to the drawing by the use of reference characters, and wherein like characters designate like parts in the different views, S designates the improved shears as a whole and which in their elementary construction comprise a pair of cooperating blades 10 and 11 pivotally connected at P, the blades in common with prior constructions have integral extensions on the opposite side of the pivot forming handles having hand grips 12.

The shears thus far described are of usual construction and the relative lengths of the blades and handles as well as the widths and thicknesses of the blades may be varied as conditions of use may require.

In accordance with this invention the blades 10 and 11 are provided with substantially triangular teeth 13 whose angular edges are bevelled as at b at the outer sides of the blades thus providing cutting edges with the adjacent sides of the blades plane for efficient shearing action.

The teeth 13 are provided by notching out the adjacent edges of the blades 10 and 11 and the teeth may be of any desired number and size as any particular conditions of use may require.

The teeth 13 are directly opposed on the two blades 10 and 11 and the apices of opposed teeth first contact in the cutting or shearing operation as is apparent from Figure 2.

With this improved construction of blades, an object such as a branch B will be received in opposed recesses intervening the teeth as illustrated in Figure 2 and will be positively retained against creeping longitudinally of the blades during the cutting operation and therefore most efficient leverage can be obtained by cutting the object adjacent the pivot P where it will be positively retained by the triangular cutting teeth 13.

While the adjacent sides of the blades 10 and 11 should be in firm bearing contact for most efficient shearing action, slight lateral displacement of the teeth may result in jamming or interlocking thereof in the absence of means to prevent such a possible occurrence.

The invention however, provides such means by rounding or convexing the apice of the teeth adjacent the plane sides thereof as indicated at 15, most clearly shown in Figures 3 and 4.

By thus rounding the apices, the corresponding teeth of opposed blades will ride past each other in proper shearing relation even though they may be out of alinement as will be readily appreciated upon inspection of Figure 3.

Furthermore, by the rounding of the tooth apices, the teeth may be normally out of line as indicated by the line L in Figure 3, whereupon the corresponding teeth of opposed blades will frictionally engage at their plane surfaces even though the pivot P may be somewhat loose and the alined relation of corresponding teeth may vary substantially throughout the lengths of the blades.

It will be seen from the foregoing disclosure that an improved shears is provided in accordance with this invention which is highly efficient in operation and which substantially overcomes the disadvantages inherent in prior shear constructions.

While I have disclosed but a single specific embodiment of my invention, such is to be considered as illustrative only, and not restrictive, the scope of the invention being defined in the subjoined claims.

What I claim and desire to secure by United States Letters Patent is:

1. A shears comprising a pair of pivoted blades, triangular teeth on adjacent edges of the blades, the teeth being bevelled on the outer faces thereof providing angular cutting edges with the adjacent sides of the blades plane for frictional shearing engagement, the teeth being equally spaced lengthwise of the blades for contact of the apices of the teeth in the closing movement of the blades, and convex surfaces on the apices adjacent the said plane sides to prevent interlocking or jamming of the blades and assure proper cutting action irrespective of misalinement of the teeth.

2. A shears comprising a pair of pivoted blades, triangular teeth on adjacent edges of the blades, the teeth being beveled for providing angular cutting edges, and the apices of the teeth being in substantial alinement in the approach of corresponding teeth of the blades in the closing or cutting movement thereof, the apices of the teeth being transversely rounded to prevent jamming or interlocking of the teeth.

OWEN K. CLINTON.